US009283798B2

(12) United States Patent
Jolic

(10) Patent No.: US 9,283,798 B2
(45) Date of Patent: Mar. 15, 2016

(54) OPTICALLY VARIABLE COLOUR IMAGE

(71) Applicant: Innovia Security Pty Ltd, Craigieburn, Victoria (AU)

(72) Inventor: Karlo Ivan Jolic, Craigieburn (AU)

(73) Assignee: Innovia Security Pty Ltd, Victoria (AU)

( * ) Notice: Subject to any disclaimer, the term of this patent is extended or adjusted under 35 U.S.C. 154(b) by 0 days.

(21) Appl. No.: 14/411,355

(22) PCT Filed: Jun. 28, 2013

(86) PCT No.: PCT/AU2013/000701
§ 371 (c)(1),
(2) Date: Dec. 24, 2014

(87) PCT Pub. No.: WO2014/000044
PCT Pub. Date: Jan. 3, 2014

(65) Prior Publication Data
US 2015/0352882 A1  Dec. 10, 2015

(30) Foreign Application Priority Data

Jun. 29, 2012 (AU) ................................ 2012100985

(51) Int. Cl.
*G02B 27/10* (2006.01)
*B42D 25/30* (2014.01)
*G02B 27/12* (2006.01)
*G02B 3/00* (2006.01)

(52) U.S. Cl.
CPC ............... *B42D 25/30* (2014.10); *G02B 3/005* (2013.01); *G02B 3/0056* (2013.01); *G02B 27/1086* (2013.01); *G02B 27/123* (2013.01); *G02B 27/126* (2013.01)

(58) Field of Classification Search
CPC .............................. G02B 3/005; G02B 3/0056
USPC ............................................................ 359/619
See application file for complete search history.

(56) References Cited

U.S. PATENT DOCUMENTS

| 7,333,268 B2 | 2/2008 | Steenblik et al. | |
| 2007/0075150 A1* | 4/2007 | Luthi | B42D 25/342 235/494 |

FOREIGN PATENT DOCUMENTS

| WO | WO 2012/024718 A1 | 3/2012 |
| WO | WO 2012/027779 A1 | 3/2012 |

OTHER PUBLICATIONS

Miyashita, T.; "Standardization for Microlenses and Microlens Arrays"; 2007; *Japanese Journal of Applied Physics*; 46, p. 5391.

(Continued)

*Primary Examiner* — William Choi
(74) *Attorney, Agent, or Firm* — Alston & Bird LLP

(57) ABSTRACT

A security element including: a plurality of focusing elements, a plurality of image regions where each image region is associated with a focusing element, each image region is printed with at least two layers, the first layer is offset by a first predetermined amount from a reference axis in the image region, the second layer is offset by a second predetermined amount from a reference axis in the image region, each layer being in different colors, and each image region includes at least a first and second sub-region, wherein a first image is formed in a first range of viewing angles from the first sub-region and a second image is formed in a second range of viewing angles from the second sub-region.

21 Claims, 12 Drawing Sheets

(56) References Cited

OTHER PUBLICATIONS

International Search Report and Written Opinion from International Application No. PCT/AU2013/000701, dated Jul. 31, 2013.

\* cited by examiner

OPTICALLY VARIABLE COLOUR IMAGE

FIELD OF THE INVENTION

The present invention relates to optically variable colour elements for security and decorative purposes, and methods of their manufacture.

BACKGROUND TO THE INVENTION

It is known to provide an optically variable device where arrays of lenticular (part-cylindrical) lenses focus on an object plane that has multiple sets of interleaved image elements. Each set of image elements belong to a distinct image, so that as a person viewing the device changes the viewing angle, different images may become visible. Optically variable devices are also known to include two-dimensional arrays of non-cylindrical lenses, in particular spherical microlenses.

In security documents and in particular flexible security documents such as banknotes, it may be desirable to minimise the thickness of the lenticular or microlens arrays. To produce these security documents, the microlenses or lenticular arrays will necessarily have a relatively small focal length and consequently, a desirable transverse dimension would be on the order of 50-65 microns or even less.

Producing microlenses of this size places constraints on the processes used to apply the image elements on the object plane. For example, gravure printing (also known as rotogravure printing) presently only produce printed line widths of approximately 35 microns or more. With this limitation of approximately 35 microns on the line width, lenses with a transverse dimension 65 microns are only wide enough to allow simple optical variable effects.

Simple optically variable effects known as a 'flipping image' effect have been developed for lenses with these relatively small transverse dimensions, such as the device as described in PCT/AU2011/001095, incorporated herein by reference in its entirety. A 'flipping image' is an image that changes between different states, for example between a positive state and a negative state, at different angles. In this document, PCT/AU2011/001095, an optically variable device is provided with an array of microlenses or lenticules that have two sets of image elements within each field of view of a microlens or lenticule of the array. In particular it has been found that cross-talk may be minimised, if the first and second images are contrast-inverted versions of each other in conjunction with an off-focus lens design to produce a two channel 'flipping image'. However this optically variable device is limited only to images that are monochromatic.

Another optically variable effect such as a multi-channel 'flipping' effect has also been developed, such as the device as described in PCT/AU2011/001063, incorporated herein by reference in its entirety. Here, an array of microlenses or lenticules with transverse dimensions on the order 65 microns is placed in an off-focus position to a set of image elements. The image elements additionally may be sub-divided into a set of sub-regions, where each image element in a sub-region is phase-displaced to the image element in another sub-region. Each sub-region now contributes a further image as the viewing angle changes. A plurality of sub-regions may be provided to produce a greyscale image that may change contrast continuously as the viewing angle changes. However this multi-channel optically variable device is limited to a monochromatic or greyscale image.

This single colour limitation is due to the inability of current printing processes to register additional (interlaced) colour layers to the first (interlaced) colour layer at the desirable line widths of approximately 35 microns or less. In particular, the registration tolerance of the gravure press is currently insufficient to successfully interlace additional colour layers underneath microlenses suitable for gravure-printed lenticular images on banknotes.

In view of the difficulties above, it is desirable to produce a security element that is more resistant to counterfeiting but still can be produced by current printing processes, such as gravure printing.

Definitions

Focal Point Size H

As used herein, the term focal point size refers to the dimensions, usually an effective diameter or width, of the geometrical distribution of points at which rays refracted through a lens intersect with an object plane at a particular viewing angle. The focal point size may be inferred from theoretical calculations, ray tracing simulations, or from actual measurements.

Focal Length F

In the present specification, focal length, when used in reference to a microlens in a lens array, means the distance from the vertex of the microlens to the position of the focus given by locating the maximum of the power density distribution when collimated radiation is incident from the lens side of the array (see T. Miyashita, "Standardization for microlenses and microlens arrays" (2007) *Japanese Journal of Applied Physics* 46, p 5391).

Gauge Thickness T

The gauge thickness is the distance from the apex of a lenslet on one side of the transparent or translucent material to the surface on the opposite side of the translucent material on which the image elements are provided which substantially coincides with the object plane.

Lens Frequency and Pitch

The lens frequency of a lens array is the number of lenslets in a given distance across the surface of the lens array. The pitch is the distance from the apex of one lenslet to the apex of the adjacent lenslet. In a uniform lens array, the pitch has an inverse relationship to the lens frequency.

Lens Width W

The width of a lenslet in a microlens array is the distance from one edge of the lenslet to the opposite edge of the lenslet. In a lens array with hemispherical or semi-cylindrical lenslets, the width will be equal to the diameter of the lenslets.

Radius of Curvature R

The radius of curvature of a lenslet is the distance from a point on the surface of the lens to a point at which the normal to the lens surface intersects a line extending perpendicularly through the apex of the lenslet (the lens axis).

Sag Height S

The sag height or surface sag s of a lenslet is the distance from the apex to a point on the axis intersected by the shortest line from the edge of a lenslet extending perpendicularly through the axis.

Refractive Index N

The refractive index of a medium n is the ratio of the speed of light in vacuo to the speed of light in the medium. The refractive index n of a lens determines the amount by which light rays reaching the lens surface will be refracted, according to Snell's law:

$$n_1 * \mathrm{Sin}(\alpha) = n * \mathrm{Sin}(\theta),$$

where $\alpha$ is the angle between an incident ray and the normal at the point of incidence at the lens surface, $\theta$ is the angle between the refracted ray and the normal at the point of incidence, and $n_1$ is the refractive index of air (as an approximation $n_1$ may be taken to be 1).

Conic Constant P

The conic constant P is a quantity describing conic sections, and is used in geometric optics to specify spherical (P=1), elliptical (0<P<1, or P>1), parabolic (P=0), and hyperbolic (P<0) lens. Some references use the letter K to represent the conic constant. K is related to P via K=P−1.

Lobe Angle

The lobe angle of a lens is the entire viewing angle formed by the lens.

Abbe Number

The Abbe number of a transparent or translucent material is a measure of the dispersion (variation of refractive index with wavelength) of the material. An appropriate choice of Abbe number for a lens can help to minimize chromatic aberration.

Security Document

As used herein, the term security document includes all types of documents and tokens of value and identification documents including, but not limited to the following: items of currency such as banknotes and coins, credit cards, cheques, passports, identity cards, securities and share certificates, driver's licences, deeds of title, travel documents such as airline and train tickets, entrance cards and tickets, birth, death and marriage certificates, and academic transcripts.

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T < L_0$ where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Spot Colours

Spot colours are known, in offset printing, as colours generated by an ink printed using a single run. In particular, spot colours are known to mean any colour generated by a non-standard offset ink; such as metallic, fluorescent, spot varnish or custom hand-mixed inks. For example, one or more layers of inks in spot colours may be used in the printing of a security element, document or a banknote which may or may not be used in conjunction with colours of standard printing processes.

SUMMARY OF THE INVENTION

According to a first aspect of the present invention, there is provided a security element including: a plurality of focusing elements, a plurality of image regions where each image region is associated with a focusing element, each image region is printed with at least two layers, the first layer is offset by a first predetermined amount from a reference axis in the image region, the second layer is offset by a second predetermined amount from a reference axis in the image region, each layer being in different colours, and each image region includes at least a first and second sub-region, wherein a first image is formed in a first range of viewing angles from the first sub-region and a second image is formed in a second range of viewing angles from the second sub-region.

In a preferred embodiment, the second image may be a complementary colour version of the first image. This allows a security element to be provided that has multiple colours that are applied that can now allow for increased security due to the increased difficulty of counterfeiting a security element with multiple different colour-switches. The security element may also allow a design of a banknote or other security document increased design flexibility to explore more colourful and varied designs.

Preferably, the image region may be printed with a third layer wherein the third layer is a different colour to either the first or second layer and that the third layer is offset by a third predetermined amount from the reference axis in the image region. Even more preferably, the image region may be printed with a fourth layer wherein the fourth layer is a different colour to either the first, second or third layer and that the fourth layer is offset by a fourth predetermined amount from the reference axis in the image region. Preferably the colours of the first, second, third or fourth layers may be identical.

The security element may also include that the image regions are at least partly printed with at least one additional layer. Preferably, the at least one additional layer may be one of a selection of white, off-white or a light shade of any colour. The additional layer may also be black or a dark shade of any colour.

As a preferred embodiment the layers may be printed in colours that correspond to known colour channels. At least one of the layers of the image region may be printed with a colour that corresponds to the RGB colour channel of a colour image with RGB channels. Alternatively, at least one of the layers of the image region may be printed with a colour that corresponds to the CMYK colour channel of a colour image with CMYK colour channels. Thus the security element will be able to be used with conventional colour representations.

As yet another preferred embodiment, the layers maybe printed in colours that are similar to known colour channels. At least one of the layers of the image region may be printed with a colour that is similar to the RGB colour channel of a colour image with RGB channels. Preferably, at least one of the layers of the image region is printed with a colour that is similar to the CMYK colour channel of a colour image with CMYK colour channels.

As yet another preferred embodiment, at least one layer may be printed in colours that does not correspond to standard colour channels, such as a CMYK or RGB colour channel. For example, the layers may be printed in spot colours; including metallic, fluorescent or custom-designed colours. This allows a designer to choose colours that may have the preferred contrast or visibility for the security element, document or banknote.

Another embodiment of the invention is directed to a security element including that at least two of the layers of the image region are printed with a colour that does not correspond to a CMYK, RGB or other standard colour channel. Preferably, the at least two layers may be contrasting colours. The advantage of a two or three layer system is that a two-colour or three-colour system may result in the highest visibility or contrast yet reduce the printing and processing costs in comparison to a colour system with more layers.

Preferably, the security element may also include that at least one offset is a function of a gray-scale value of the colour channel of the colour of the corresponding layer. Preferably, the function includes that the at least one offset is proportional to the gray-scale value of the colour channel of the colour of the corresponding layer. Preferably, the function includes that the at least one offset is proportional to a position of the image region from a reference point.

Even more preferably, the security element may include at least two offsets that are functions of the gray-scale values of the colour channels of the colour of the corresponding layers. Preferably, the at least two offsets may be proportional to the gray-scale values of the colour channels of the colour of the corresponding layers.

The security element may have focusing elements located on one side of a transparent or translucent substrate and the image regions may be located on the opposite side of a transparent or translucent substrate. The focusing elements may be located a distance t from image regions which is substantially half the focal length of the focusing elements or at a distance t from image regions which is substantially the same or less than the focal length of the focusing elements. Preferably, the focusing elements may be refractive or diffractive part cylindrical lenses, prisms, zone plates, refractive or diffractive part spherical lenses or polygon based micro lenses. Optionally, the focusing elements may be a sampling screen where the sampling screen may have printed parallel lines or may be a sampling screen with screen elements that have locations that are proportional to the offsets of the layers of the image region. Alternatively the focusing elements may be diffractive elements, and the diffractive elements may include diffraction gratings.

The image regions may be line elements, dot elements or elements of other shapes; they preferably have a width substantially equal to or greater than half the width of the focusing elements. Particularly, the image regions may have a width substantially equal to the focal point width of the focusing elements at the image plane. Even more particularly, the image regions may have a width that differs from the focal point width of the focusing elements at the image plane by a predetermined amount.

The image regions may be applied using gravure printing, offset printing, flexographic printing, screen printing or embossing.

In a further aspect, the present invention provides a security document or security device or a method of manufacturing a security document or security device including the security element according to any of the above embodiments.

In yet another aspect, the present invention provides a bank note including a security element according to any of the above embodiments.

In yet another further aspect of the present invention there is provided a method of forming a security element including the steps of: providing a transparent or translucent substrate, applying a plurality of focusing elements to a first surface of the transparent or translucent substrate, applying a plurality of image regions to the opposite surface of the substrate with at least two layers, wherein the first layer is offset by a first predetermined amount and the second layer is offset by a second predetermined amount from a reference axis in each image region, each layer is printed in different colours and wherein each image region includes at least a first and second sub-region, wherein a first image is formed in a first range of viewing angles from the first sub-region and a second image is formed in a second range of viewing angles from the second sub-region.

In a preferred embodiment of the method includes the step of applying the image region with a third layer wherein the third layer is a different colour to either the first or second layer and that the third layer is offset by a third predetermined amount from the reference axis in the image region. Preferably, the method includes the step of applying the image region with a fourth layer wherein the fourth layer is a different colour to either the first, second or third layer and that the fourth layer is offset by a fourth predetermined amount from the reference axis in the image region. Preferably, any of the colours of the first, second, third or fourth layers applied may be identical.

The image regions may be applied with at least one additional layer and that additional layer may be one of a selection of white, off-white or a light shade of other colour. The additional layer may also be black or a dark shade of any colour. This allows designers the choice of producing the security element to be viewed primarily as a reflective or transmissive element.

In an especially preferred embodiment of the method, the method includes the step of applying at least one of the layers of the image region in a colour that corresponds to or similar to a RGB colour channel of a colour image with RGB channels. As an alternative, the method may include applying at least one of the layers of the image region in a colour that corresponds to or is similar to the CMYK colour channel of a colour image with CMYK colour channels.

As a further alternative, the method may include applying at least one of the layers of the image region in a colour that does not correspond to standard colour channels, such as CMYK or RGB colour channels. For example, the layers may be printed in spot colours; including metallic, fluorescent or custom-designed colours. This allows a designer to choose colours that may have the preferred contrast or visibility for the security element, document or banknote.

Another embodiment of the invention is directed to a method of producing a security element including the step of applying at least two of the layers of the image region in a colour that does not correspond to a CMYK, RGB or other standard colour channel. Preferably, the at least two layers may be applied in contrasting colours. The advantage of a two or three layer system is that a two-colour or three-colour system based on CMYK, RGB or other colours, such as spot colours may result in the highest visibility or contrast yet reduce the printing and processing costs in comparison to a colour system with more layers.

Preferably, the method includes the step that at least one offset is a function of a gray-scale value of the colour channel of the colour of the corresponding layer. Preferably, the function includes that the at least one offset is proportional to the gray-scale value of the colour channel of the colour of the corresponding layer. Preferably, the function includes that the at least one offset is proportional to a position of the image region from a reference point.

The focusing elements may be located a distance t from image regions which is substantially half the focal length of the focusing elements or a distance t from image regions which is substantially the same or less than as the focal length of the focusing elements.

The focusing elements may be applied as refractive or diffractive part cylindrical lenses, prisms or zone plates, refractive or diffractive part spherical lenses or polygon based micro lenses, as a sampling screen, as a sampling screen with printed parallel lines or as a sampling screen with screen elements that have locations that are functions of the offsets of the layers of the image region. Preferably, the focusing elements may be applied as diffractive elements, which may include diffraction gratings.

The image regions may be applied as line elements, dot elements or as elements of other shapes. Preferably, the image regions may have a width substantially equal to or greater than half the width of the focusing elements. More preferably, the image regions may have a width substantially to or greater than half the width of the focusing elements. Even more preferably, the image regions may have a width that differs from the focal point width of the focusing elements at the image plane by a predetermined amount.

The image regions may have layers that are applied using gravure printing, offset printing, flexographic printing, screen printing or embossing.

BRIEF DESCRIPTION OF THE DRAWINGS

In order that the present invention may be more readily understood, a preferred embodiment thereof will now be described, by way of example only, with reference to the accompanying drawings, in which:

FIG. 6a shows the colours seen at viewing angle A, while

FIG. 8b shows a magnified area of the colour source input image of FIG. 8a.

FIGS. 9a, 9b and 9c show the corresponding gray-scale red, green and blue images of the magnified area of FIG. 8a.

DESCRIPTION OF PREFERRED EMBODIMENT

Figure 1:
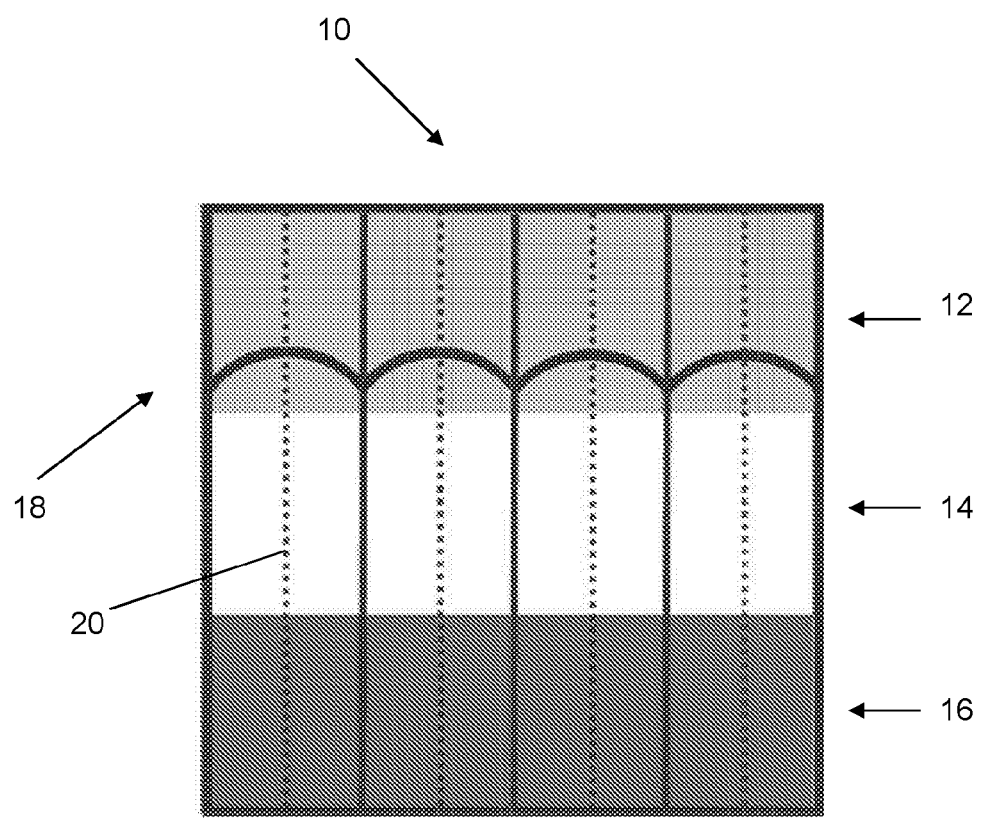
FIG. 1 shows a source image with three colour channels.

Referring now to FIG. 1, there is shown a portion of a security element having a source image 10 according to a preferred embodiment of the present invention. The source image 10 includes three colour channels and has three sections where each section is coloured with a primary colour and is approximately a third the area of the source image. The top section 12 is coloured red, the middle section 14 is coloured green and the bottom section 16 is coloured blue. The curved line represents the focusing elements 18, which in this particular embodiment is a micro-lens array 18. The dotted lines represent the optical axis 20 of each micro-lens in the micro-lens array.

As an example, the source image 10 may include colour pixels where each pixel may have a set of RGB values (r,g,b) where for simplicity, the RGB values have been normalised from 0 (min) to 1 (max).

Figure 2A:
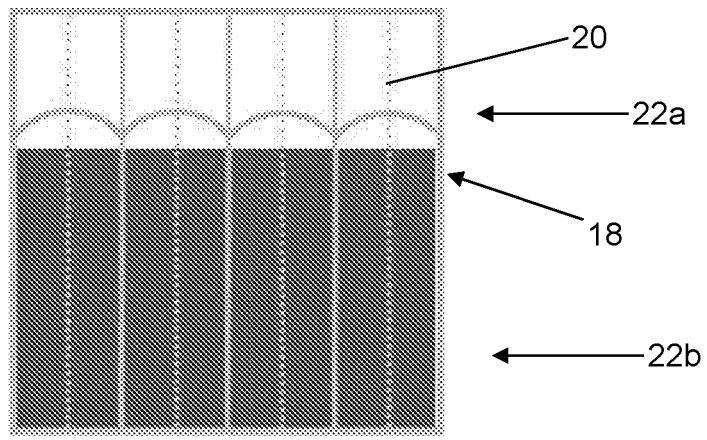
FIG. 2a shows the gray scale image of the red (R) channel.
Figure 2B:
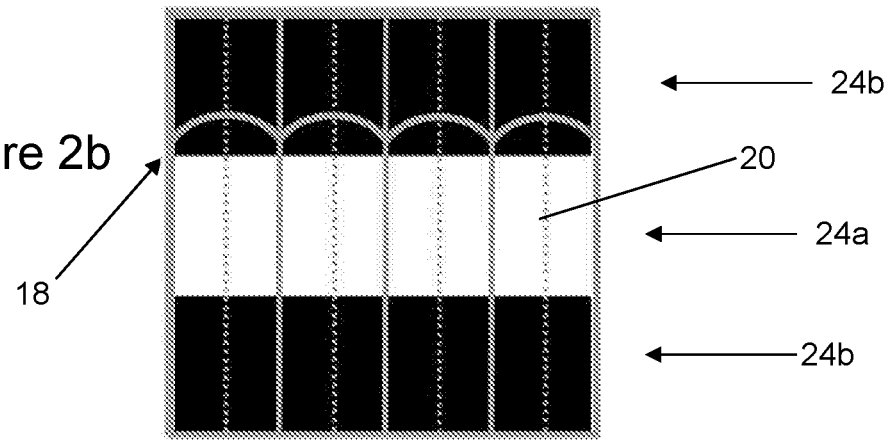
FIG. 2b is the gray scale image of the green (G) channel and FIG. 2c is the gray scale image of the blue (B) channel.
Figure 2C:
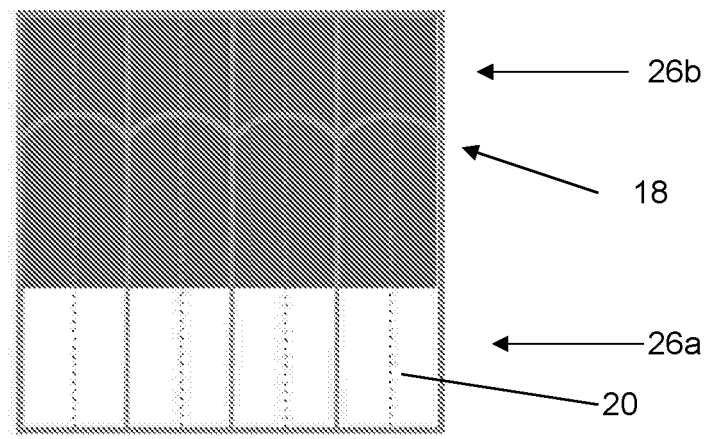

Referring now to FIGS. 2a, 2b and 2c, there is shown the gray-scale images of each component colour channel of the source image 10.

FIG. 2a shows a gray-scale image of the red (R) channel component of the source image 10 of FIG. 1. As FIG. 1 shows that the source image includes a top section 12 coloured red, then the corresponding gray-scale image of the red (R) channel of FIG. 2a shows a bright top section 22a in the top third of the gray-scale image and a dark section 22b in the bottom two thirds of the gray-scale image.

Similarly FIG. 2b shows a gray-scale image of the green (G) channel component of the source image 10 of FIG. 1. Thus as the source image component of FIG. 1 shows a middle section 14 that is coloured green, the corresponding gray-scale component of the green (G) channel shows a bright middle section 24a surrounded by dark upper and lower sections 24b.

Lastly FIG. 2c shows a gray-scale image of the blue (B) channel component of the source image 10 of FIG. 1. The source image component of FIG. 1 shows a bottom section 16 that is coloured blue, thus correspondingly the gray-scale image of the blue (B) channel must show a bright bottom section 26a in the bottom third of the gray-scale image and a dark section 26b in the top two thirds of the gray-scale image.

Therefore it can be seen that the source image 10 of FIG. 1 with three bands of primary colours of red, green and blue can be broken down into three separate gray-scale image component channels of red, green and blue of FIGS. 2a, 2b and 2c. In this particular example, each gray-scale image has a gray-scale value that has been normalised to 1, and for simplicity, the bright sections of FIGS. 2a, 2b and 2c are assumed to have a gray-scale maximum value of 1 and the dark sections are assumed to have a gray-scale minimum value of 0.

Each of FIGS. 2a, 2b and 2c also shows the micro-lens array 18 and the corresponding optical axis 20 of each micro-lens in the micro-lens array.

Figures 3A, 3B:
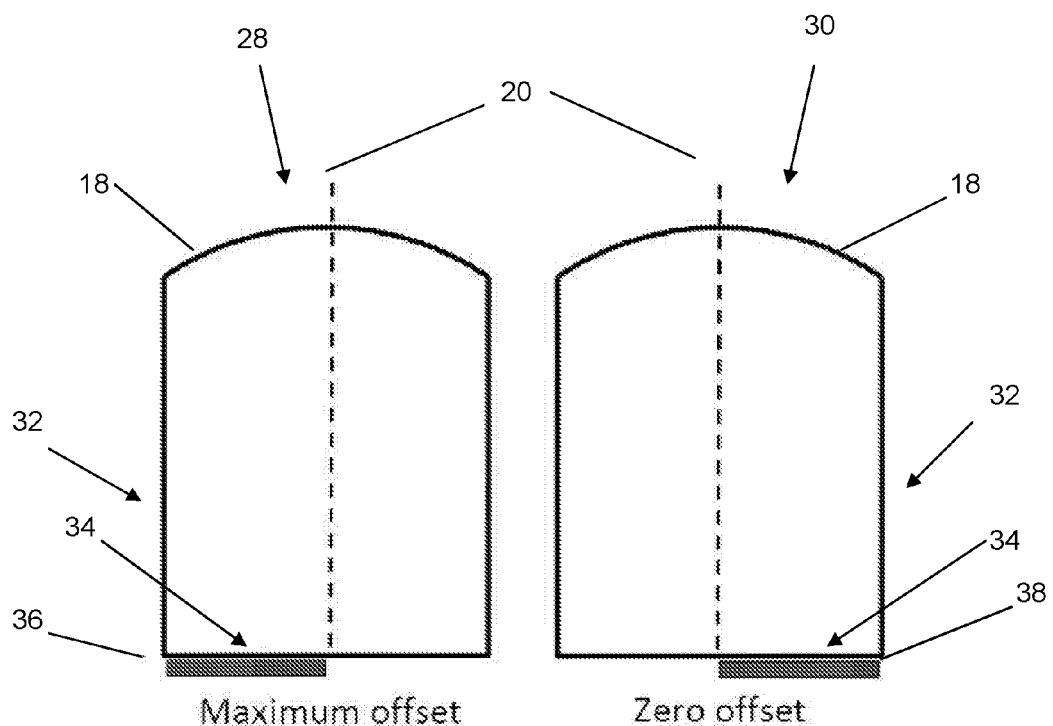
FIG. 3a shows the lines printed at maximum offset.
FIG. 3b shows the lines printed at zero offset.

FIGS. 3a and 3b shows two separate sections 28 and 30 of a sample security element for explanatory purposes. Each of FIGS. 3a and 3b shows a single focusing element 18, substrate 32 and a dotted line representing the optical axis 20. The object plane 34 is at the opposite face of the substrate 32 to the focusing element 18.

For simplicity, each of the separate sections 28 and 30 of the security element are printed with a single coloured line 36, 38 with a width that is the same as the lens half width. FIG. 3a is printed with a single printed coloured line 36 at a maximum offset from the optical axis 20, while FIG. 3b is printed with a single printed coloured line 38 with zero offset from the optical axis 20. All offsets may be normalised from 0 (min) to a maximum of a lens half width (1). It is assumed that there are no printing registration errors present.

Figure 4A:
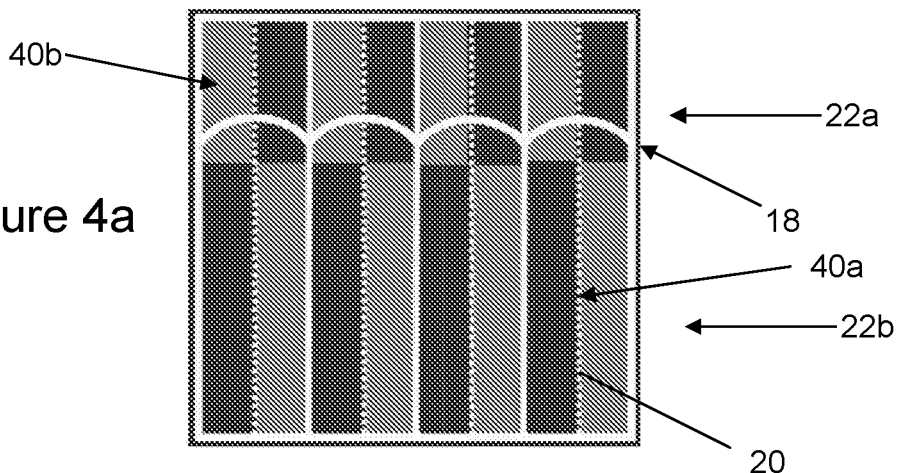
FIG. 4a shows where red (R) lines are printed according to the offset indicated in the gray scale image of FIG. 2a, FIG. 4b shows where green (G) lines are printed according to the offset indicated in the gray scale image of FIG. 2b
Figure 4B:
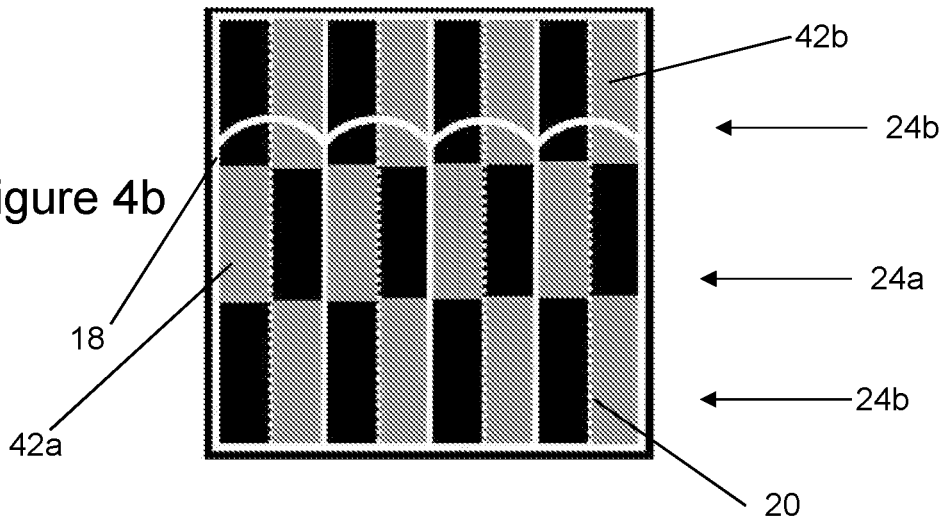
FIG. 4c shows where blue (B) lines are printed according to the offset indicated in the gray scale image of FIG. 2c.
Figure 4C:
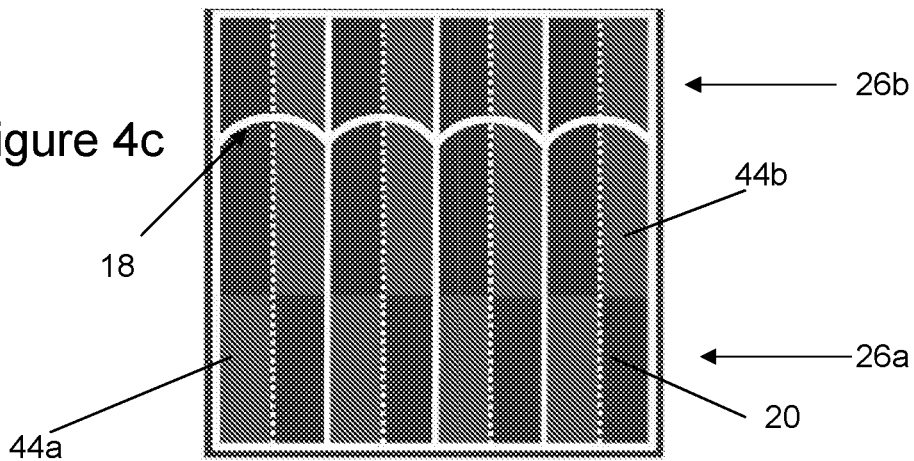

Referring now to FIGS. 4a, 4b and 4c shows the separate colour layers to be applied based on the gray-scale component channels of FIGS. 2a, 2b and 2c. First, FIG. 4a shows the layer that is applied in red. A layer of a red line 40a or 40b is applied for each focusing element 18 that has a width that is the half-width of the focusing element 18.

The position of the line 40a or 40b depends on the gray-scale image of the red channel as shown in FIG. 2a. In this embodiment of the invention, the offset of the red line 40a or 40b is proportional to the red channel gray-scale value at the corresponding location. Alternatively, the offset of the red line 40a or 40b may be a function, such as a mathematical function to the red channel gray-scale value at the corresponding location, and as such may be proportional to the red channel gray-scale value at the corresponding location or may be proportional to the position of the red line from a reference point.

Generally, in other embodiments of the invention, an offset or offsets may be a function, such as a mathematical function of the gray-scale value(s) of the colour channel(s) of the colour of the corresponding layer(s). Specifically, an offset or offsets may be proportional to the gray-scale value(s) of the colour channel(s) of the colour of the corresponding layer(s). More specifically, an offset or offsets may also be proportional to a position of the image region from a reference point. This allows a varying spatial movement or animation effect, between the first and second images.

For instance in the grey-scale image of the red channel as shown in FIG. 2a, the top section 22a has a gray scale value of 1 (maximum), thus the amount of offset of the position of the red line 40b from the optical axis is also correspondingly at a maximum. Similarly as the bottom section grey-scale image of the red channel has a gray-scale value of 0 (minimum), the amount of offset of the position of the red line 40a from the optical axis is correspondingly at a minimum.

Therefore as is shown in FIG. 3a, as the top section 22a of the gray-scale image of the red channel in FIG. 2a has a gray-scale value of 1 and an offset value of 1, the red line 40b is printed on each left hand side of the optical axis 20 in section 22a. Similarly as in FIG. 3b, the bottom section 22b of the gray-scale image of the red channel in FIG. 2a has a gray-scale value of 0 and an offset value of 0, the red line 40a is printed on each right hand side of the optical axis 20 in section 22b.

Referring now to FIG. 4b, a similar green layer is applied in the following pattern. In FIG. 2b, the gray-scale image of the green channel shows a bright middle section 24a and darker top and bottom sections 24b. This corresponds to value of 1 (maximum) gray-scale value in the green channel for middle section 24a and a value of 0 (minimum) gray-scale value in the green channel for top and bottom sections 24b.

The offset position of the green line 42a and 42b is proportional to the gray scale value in the green channel at that corresponding section. Alternatively, the offset of the green line 42a or 42b may be a function, such as a mathematical function to the green channel gray-scale value at the corresponding location, and as such may be proportional to the green channel gray-scale value at the corresponding location or may be proportional to the position of the green line from a reference point. Thus as in section 24a, the gray-scale value of the green channel is 1, all the green lines 42a are to have a maximum offset of 1 and are therefore printed on the left hand side of the optical axis 20, as illustrated in FIG. 3a. Correspondingly, in sections 24b, the green lines 42b have a minimum offset of 0 and are therefore printed on the right hand side of optical axis 20, as illustrated in FIG. 3b.

Lastly now referring to FIG. 4c, a blue layer is now applied. In FIG. 2c, the gray-scale image of the blue channel shows a bright bottom section 26a and dark top section 26b. This corresponds to value of 1 (maximum) gray-scale value in the blue channel for the bottom section 26a and a value of 0 (minimum) gray-scale value in the blue channel for the top section 26b.

The offset position of the blue line 44a and 44b is proportional to the gray scale value in the blue channel at that corresponding section. Alternatively, the offset of the blue line 44a or 44b may be a function such as a mathematical function to the blue channel gray-scale value at the corresponding location, and as such may be proportional to the blue channel gray-scale value at the corresponding location or may be proportional to the position of the blue line from a reference point. Thus as in section 26a, the gray-scale value of the blue channel is 1, all the blue lines 44a are to have a maximum offset of 1 and are therefore printed on the left hand side of the optical axis 20, as illustrated in FIG. 3a. Correspondingly, in sections 26b, the blue lines 44b have a minimum offset of 0 and are therefore printed on the right hand side of optical axis 20, as illustrated in FIG. 3b.

FIGS. 4a, 4b and 4c illustrate the separate colours layers of red, green and blue with the printed lines of colour where the offset of the line is dependent on the gray scale image of each component channel shown in FIGS. 2a, 2b and 2c.

Figure 5:
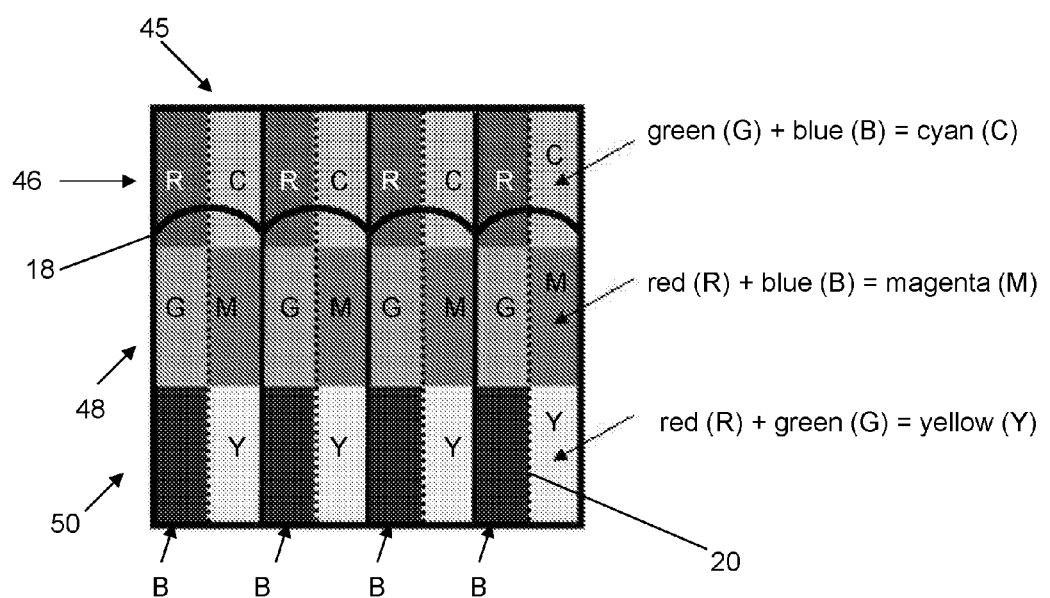
FIG. 5 shows the combination of colours resulting from the overlay of the red, green and blue layers.

FIG. 5 now shows the composite image 45 of those three layers of the three component colours of FIGS. 4a, 4b and 4c as they are printed super-imposed over the same location in a security element with a set of focusing elements 18 on a substrate 32. If there is a combination of two colour layers overlaying each other in a particular part of the image, the superimposed composite image 45 will show a different complementary colour such as cyan, magenta or yellow (it is assumed that the colours are additive). If there is only a single layer present at a particular part of the image, the superimposed composite image 46 will show the primary colour of the single layer such as red, green or blue.

For example, the top section 46 of FIG. 5 shows the superposition of the top sections 22a, 24b and 26b of FIGS. 4a, 4b and 4c. In FIG. 5, section 46 shows that only red lines 40b are present to the left of the optical axis 20 of each focusing element 18. Thus only a red image will be seen when that part of the superimposed image is viewed through the focusing element 18. Accordingly, the green lines 42b and blue lines 44b of sections 24b and 26b are now super-imposed to the right of the optical axis 20 of each focusing element 18 in top section 46. Thus the combination of the blue and green layer superimposed will present a complementary colour of cyan when that part of the image is viewed through focusing element 18. Therefore in FIG. 5, top section 46 of composite image 45 will present alternating images of red and cyan lines.

Similarly, the middle section 48 of FIG. 5 shows the superposition of the middle sections 22b, 24a and 26b of FIGS. 4a, 4b and 4c. In FIG. 5, section 48 shows that only green lines 42a are present to the left of the optical axis 20 of each focusing element 18. Thus only a green image will be seen when that part of the superimposed image is viewed through the focusing element 18. Accordingly, the red lines 40a and blue lines 44b of sections 22b and 26b are now super-imposed to the right of the optical axis 20 of each focusing element 18 in middle section 48. Thus the combination of the red and blue layer superimposed will present a complementary colour of magenta when that part of the image is viewed through focusing element 18. Therefore in FIG. 5, the superimposed image of the combined layers will show a middle section 48 of composite image 45 that will present alternating images of green and magenta lines.

Lastly, the bottom section 50 of FIG. 5 shows the superposition of the bottom sections 22b, 24b and 26a of FIGS. 4a, 4b and 4c. In FIG. 5, section 50 shows that only blue lines 44a are present to the left of the optical axis 20 of each focusing element 18. Thus only a blue image will be seen when that part of the superimposed image is viewed through the focusing element 18. Accordingly, the red lines 40a and green lines 42b of sections 22b and 24b are now super-imposed to the right of the optical axis 20 of each focusing element 18 in bottom section 50. Thus the combination of the red and green layer superimposed will present a complementary colour of yellow when that part of the image is viewed through focusing element 18. Therefore in FIG. 5, the superimposed image of the combined layers will show a bottom section 50 of composite image 45 that will present alternating images of blue and yellow lines.

Figure 6A:
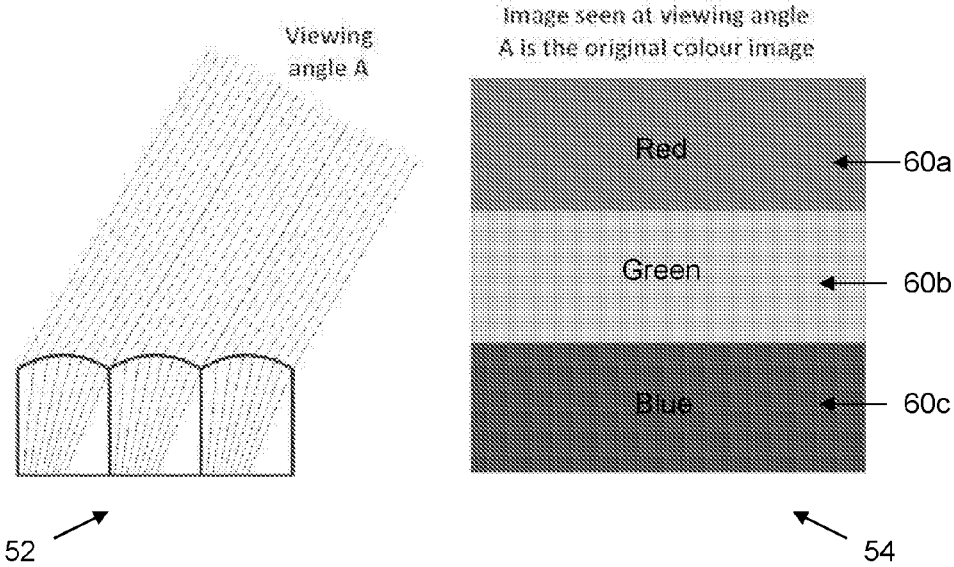
Figure 6B:
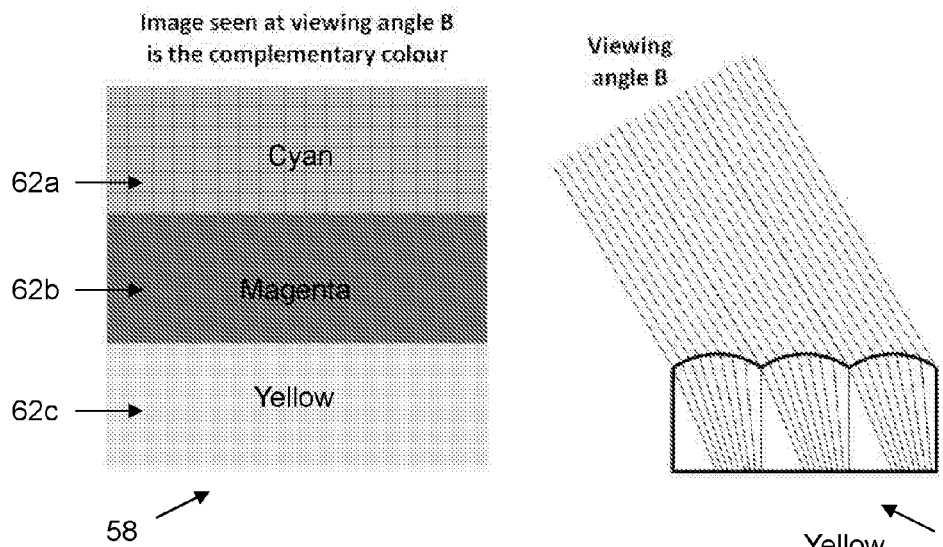
FIG. 6b shows the complementary colours seen at viewing angle B.

Referring now to FIG. 6a which shows a ray diagram 52 of the part of the image that is seen at a first viewing angle A and the subsequent colour image 54 viewed from a security device printed with the composite image 45 of FIG. 5. As can be seen in FIG. 6a, the focussing elements 18 are, in this example, "out-of-focus". That is, the focussing elements 18 are designed to have a focus region which is, substantially, the same width as image elements, or approximately half the width of the focussing elements. Out-of-focus focussing elements may enable implementation of the invention on thinner substrates than would otherwise be possible with in-focus focussing elements. For the avoidance of doubt, in focus or out of focus focussing elements may be used in any embodiments of the invention. The security device would have a structure similar to the structure of FIG. 3a or 3b with a set of focusing elements 18 and a substrate 32. FIG. 6b similarly shows a ray diagram 56 of part of the image seen at a second viewing angle B and the subsequent complementary colour image 58 viewed from the security device printed with the composite image 45 of FIG. 5.

In particular, FIG. 6a shows a ray diagram 52 which shows that at viewing angle A, only lines on one (left) side of the optical axis 20 may be viewed. In the composite image 45, only red, green and blue lines are present to the left of the optical axis 20 for each focusing element 18. Therefore, as shown in colour image 54, only an image of red, green and blue sections, 60a, 60b and 60c will be presented to the viewer at viewing angle A.

Similarly, FIG. 6b, shows a ray diagram 56 which shows that at viewing angle B, the lines on the other (right) side of the optical axis 20 may be viewed. In the composite image 45, only cyan, magenta and yellow lines are present to the right of the optical axis 20 for each focusing element 18. Therefore, as shown in colour image 58, only an image of cyan, magenta and yellow sections, 62a, 62b and 62c will be presented to the viewer at viewing angle B.

Thus, a security element provided with a set of focusing elements 18 on a substrate with the composite image 45 of FIG. 5 will provide, the colour image 54 with a set of colours will be seen at one viewing angle, while another colour image 58 with a set of complementary colours will be seen at another viewing angle. Thus the security element demonstrates a multi-colour switching effect when viewed at different angles.

Figure 7:
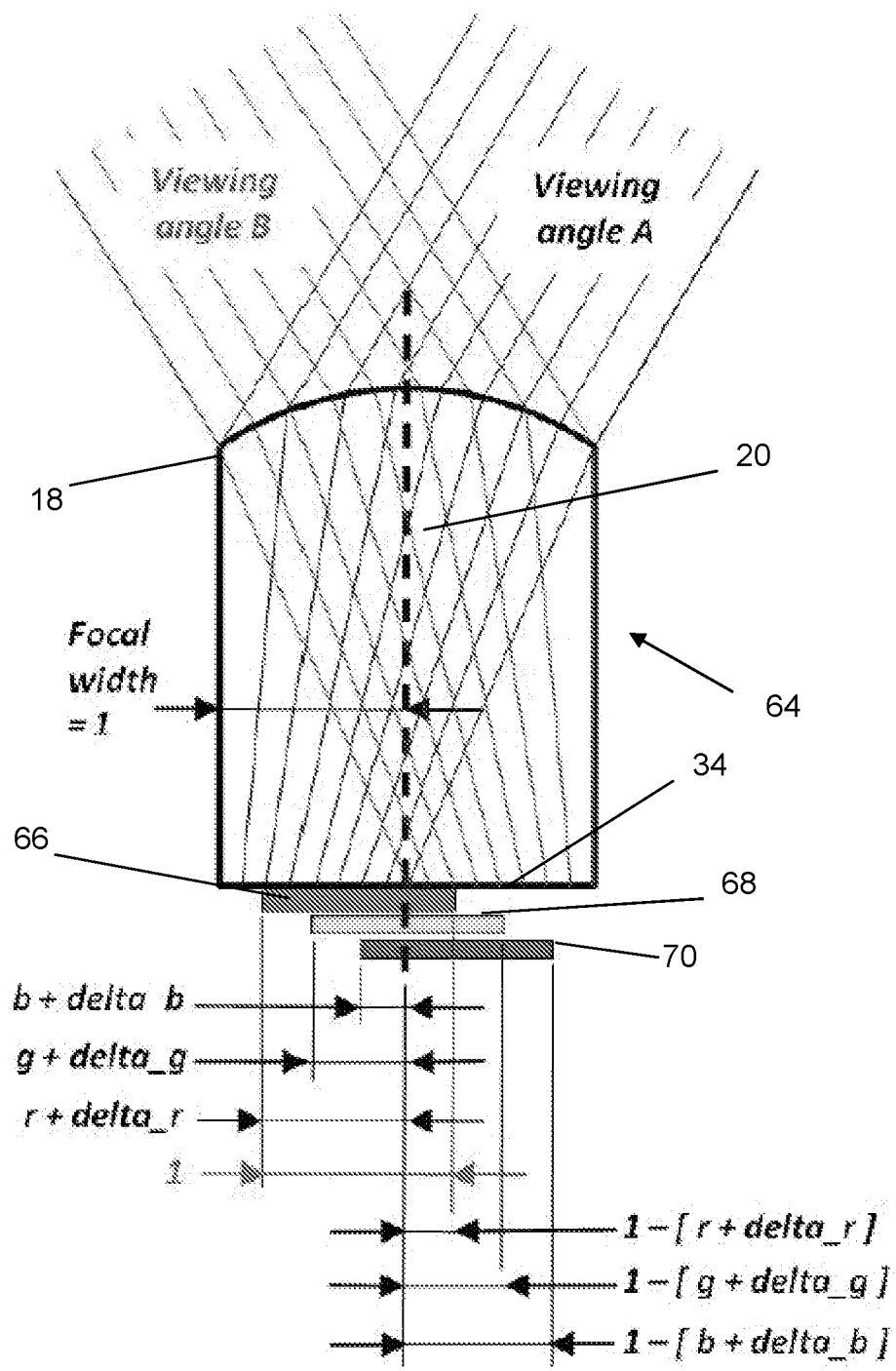
FIG. 7 shows the different layers of colour and the images at viewing angle A and B.

Referring now to FIG. 7, which shows a single part or pixel of a security element 64 that shows a cross sectional view of a single focusing element 18 and printed with three coloured lines in red 66, green 68 and blue 70. Focusing element 18 is an out-of-focus lens where for simplicity the lens focal width at the printing plane is approximately equal to the lens half width at all viewing angles.

In this embodiment of the invention, the line offset from a reference axis of each of the printed lines 66, 68 and 70 is proportional to the RGB colour values of r, g and b of an input source colour image. Specifically, the RGB colour values of the input source image of this embodiment of the invention may be normalised to a number between zero (minimum) and 1 (maximum). The reference axis in FIGS. 1 to 7 is the optical axis 20. Note that, for the first embodiment of the invention in FIGS. 1-6, that each RGB value had been normalised to a binary value of either zero (minimum) or 1 (maximum).

All the previous descriptions have been directed to printed layers and images that are assumed to have no printing registration error. However to deliver a gravure printed lenticular image on a banknote or similar thin security document, the printed lines or image elements may be limited to a width of approximately 35 microns. At this scale, each colour layer of a security element may be printed with a separate gravure cylinder and thus will introduce a printing registration error for each line within a colour layer which can be assumed to be constant. This is because during the printing of each colour layer on the back of the focusing elements, the focusing elements are approximately stationary relative to the printing surface of the gravure cylinder. The printing registration errors for each colour can be represented in the following way; delta_r is the printing registration error for red, delta_b is the printing registration for blue and delta_g is the printing registration error for red.

As shown in FIG. 7, a red line 66 has been printed underneath the focusing element 18 at the object plane 34 where the red_offset_distance=r+delta_r. Similarly, a green line 68 has been printed under the focusing element 18 where the green_offset_distance=g+delta_g and a blue line 70 has been printed under the focusing element 18 where the blue_offset_distance=b+delta_b.

A line of each colour layer 66, 68 and 70 in this embodiment of the invention has a width that is half the focusing element width.

At viewing angle A or B, the RGB colour value of the image viewed may be approximated to be proportional to the portion of each red, green and blue region that lies within the focal point width of the lens at the viewing angle (it is assumed that the colours are additive). In particular, the RGB colour value at viewing angle A is approximated at:

R colour value is $r_A = r + \text{delta\_r}$;
G colour value is $g_A = g + \text{delta\_g}$; and
B colour value is $b_A = b + \text{delta\_b}$.

Similarly, the RGB colour value at viewing angle B is approximated at:

R colour value is $r_B=1-(r+\text{delta\_r})$;
G colour value is $g_B=1-(g+\text{delta\_g})$; and
B colour value is $b_B=1-(b+\text{delta\_b})$.

Therefore it can be understood that the RGB colour value and therefore colour projected at viewing angle B is complementary to the RGB colour value and thus colour at viewing angle A. Therefore the viewer will observe a colour switching effect when changing viewing angles from A to B from the single region or pixel example of FIG. 7. Thus a more complete security element with multiple focusing elements may be designed to produce a projection of large number of different colours at viewing angle A and a projection of large number of corresponding complementary colours at viewing angle B.

Thus if there is no registration error present in any of the gravure cylinders that print each separate layer of colour, it can be understood that in principle that the colour image projected at viewing angle A will be the same as the source input colour image. Correspondingly the image projected at viewing angle B is the complementary colour image is the same as the complementary version of the source input colour image. This may be shown in the example of the simplified source image of FIGS. 1 to 5, where final colour image at viewing angle A in FIG. 6a is the same as the source image of FIG. 1, and final colour image at viewing angle B in FIG. 6b is the complementary colour version of the source image of FIG. 1.

However if the registration error is finite, so that delta_r, delta_g and delta_b are non-zero but substantially constant over the entire image region, then in principle, all R colour values in the projected image will be offset by a first fixed amount from the R values in the source image. Similarly, all G and B colour values in the projected image will be offset by a second and third fixed amount from the G and B colour values in the source image. All RGB colour offsets will correspond to the RGB colour registration error, delta_r, delta_g and delta_b. Therefore the image projected at viewing angle A will be colour-modulated variant of the input source image and the image projected at viewing angle B will be the corresponding complementary colour image of the colour-modulated variant. This is regardless of the registration error of each colour layer in the finished lenticular or micro-lens image.

Figure 8A:
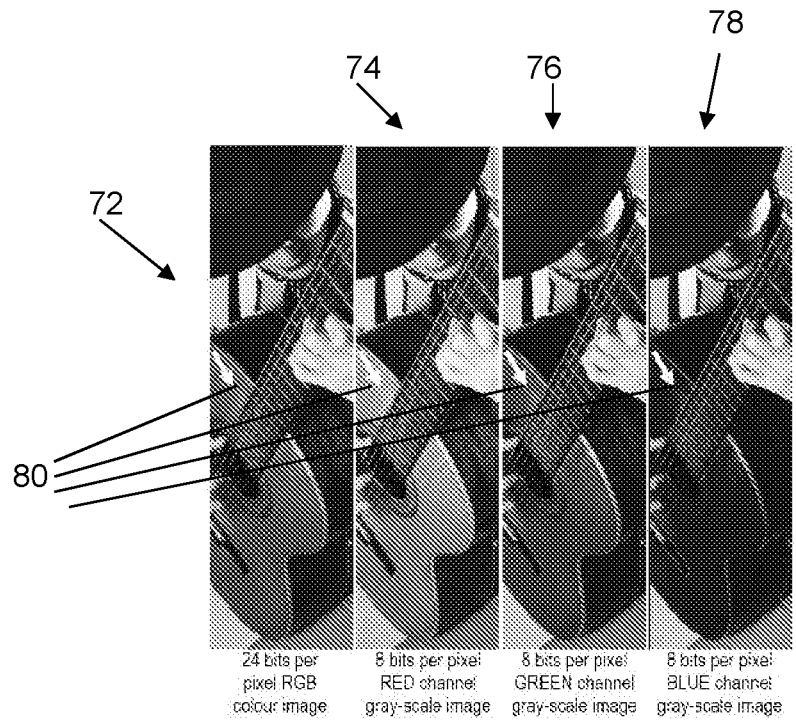
FIG. 8a shows a sample 24 bits per pixel RGB colour image with three corresponding 8 bits per pixel grey-scale images in the red, green and blue channels
Figure 8B:
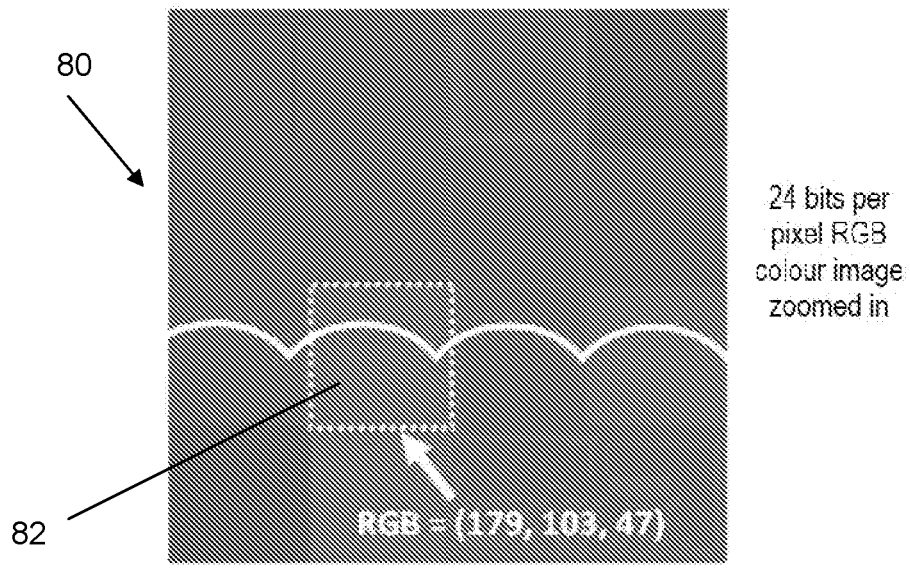

Referring now to FIG. 8a, these figures show views of four images 72, 74, 76 and 78. Image 72 is a 24 bits per pixel source input colour image which is a composite of three colour channels R, G and B. Each corresponding colour channel has 8 bits per pixel gray-scale image as shown in the images 74, 76 and 78. Note that the RGB channel colour values are integers in the range from 0 to 255. FIG. 8b shows a zoomed in area 80 as indicated by the white arrow in each of the source input colour image. In particular, a single 24 bit pixel 82 is outlined with a white dotted line with an RGB value of (179, 103, 47). It is assumed that there is no printing registration error.

Figure 9A:
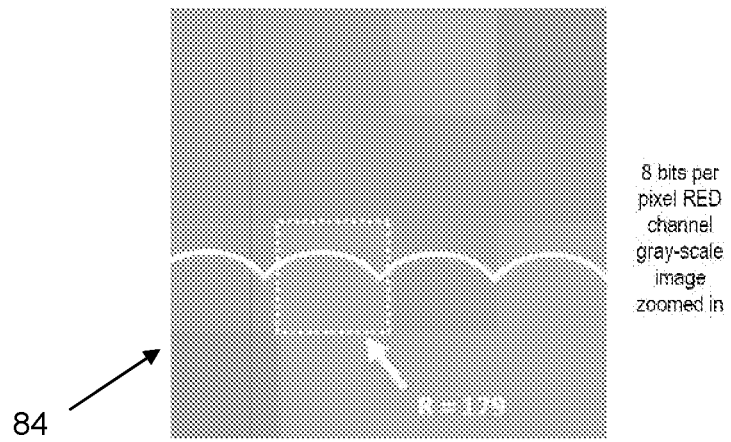
Figure 9B:
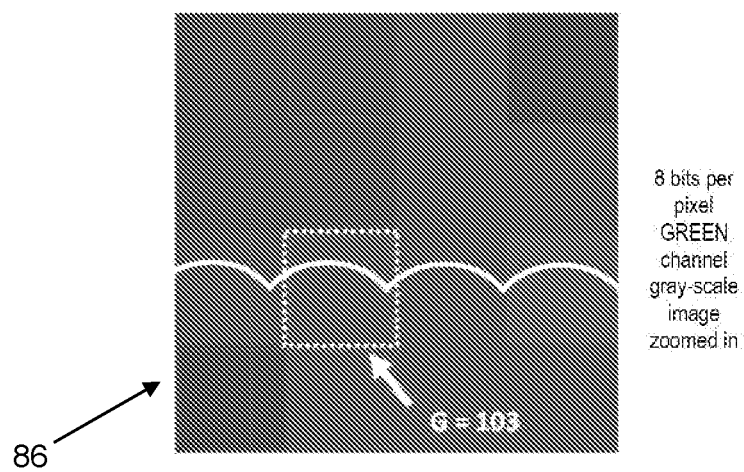
Figure 9C:
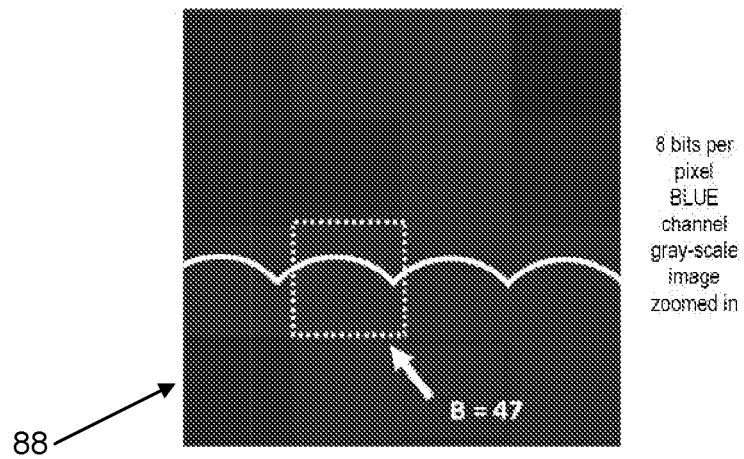

In FIGS. 9a, 9b and 9c, there is shown views of zoomed in area 80 of FIG. 8a of the corresponding gray-scale colour channel images in red, green and blue of the source input colour image 72. FIG. 9a shows the 8 bit pixels of the zoomed in area 80 in the red channel gray-scale image 84, and in particular that pixel with a dotted outline has a gray-scale value in the red channel of 179. FIG. 9b shows the 8 bit pixels of the zoomed in area 80 in the green channel gray-scale image 86, and in particular that pixel with dotted outline has a gray-scale value in the green channel of 103. Lastly FIG. 9c shows the 8 bit pixels of the zoomed in area 80 in the blue channel gray-scale image 88, and in particular that pixel with dotted outline has a gray-scale value in the blue channel of 47.

Figure 10A:
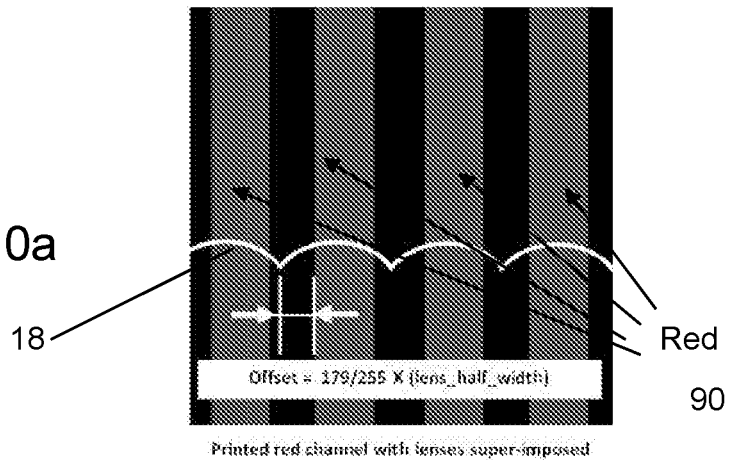
FIGS. 10a, 10b and 10c shows the different layers of red, green and blue printed for each colour channel.
Figure 10B:
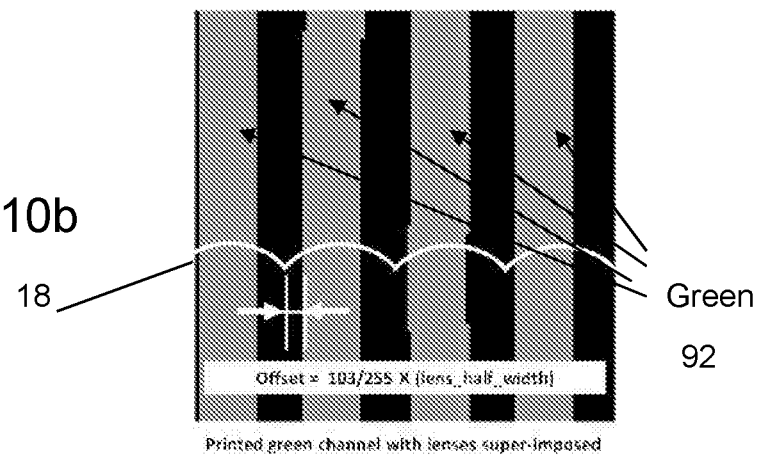
Figure 10C:
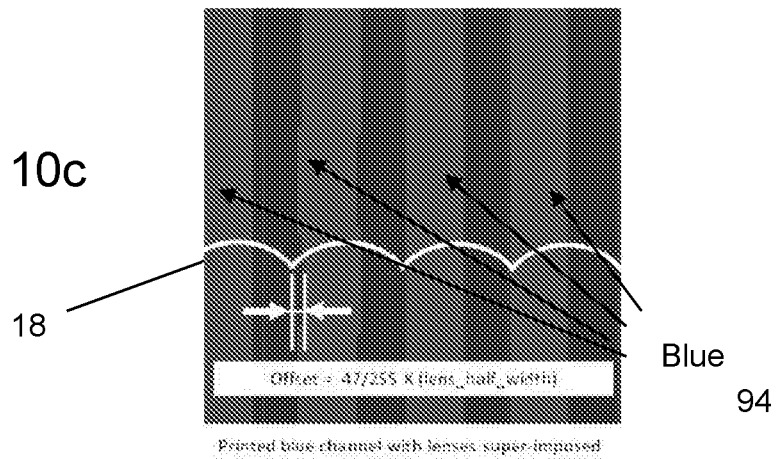

Referring now to FIGS. 10a, 10b and 10c, there is shown views of image regions in the form of lines in the three colour channels that may be printed on the back of focusing elements 18 for corresponding pixels in gray-scale images 84, 86 and 88.

Particularly, it can be seen that in FIG. 10a, that the image regions 90 are in red, and that the edge of the image regions or lines 90 are offset from a reference axis proportional to the R value of the pixel of the gray scale image 84 in the red channel in FIG. 9a. The offset of the pixel with the dotted outline in the image region in FIG. 10a can be calculated as 179/255×(lens half width). In these FIGS. 10a, 10b and 10c, the reference axis is the left edge of the focusing element 18.

Similarly for FIGS. 10b and 10c, image regions 92 and 94 are green and blue respectively, and again the edge of the image regions 92 or 94 are offset from the reference axis of the left edge of the focusing element 18. The offset of the image regions 92 in FIG. 10b is proportional to the G value of the pixels of the gray scale image 86 in the green channel in FIG. 9b, and the specific offset value of the pixel with the dotted outline can be calculated as 103/255×(lens half width). Similarly, the offset of the image regions 94 in FIG. 10c is proportional to the B values of the pixels of the gray scale image 88 in the blue channel in FIG. 9c, and the specific offset value of the pixel with the dotted outline can be calculated as 47/255×(lens half width).

Figure 11:
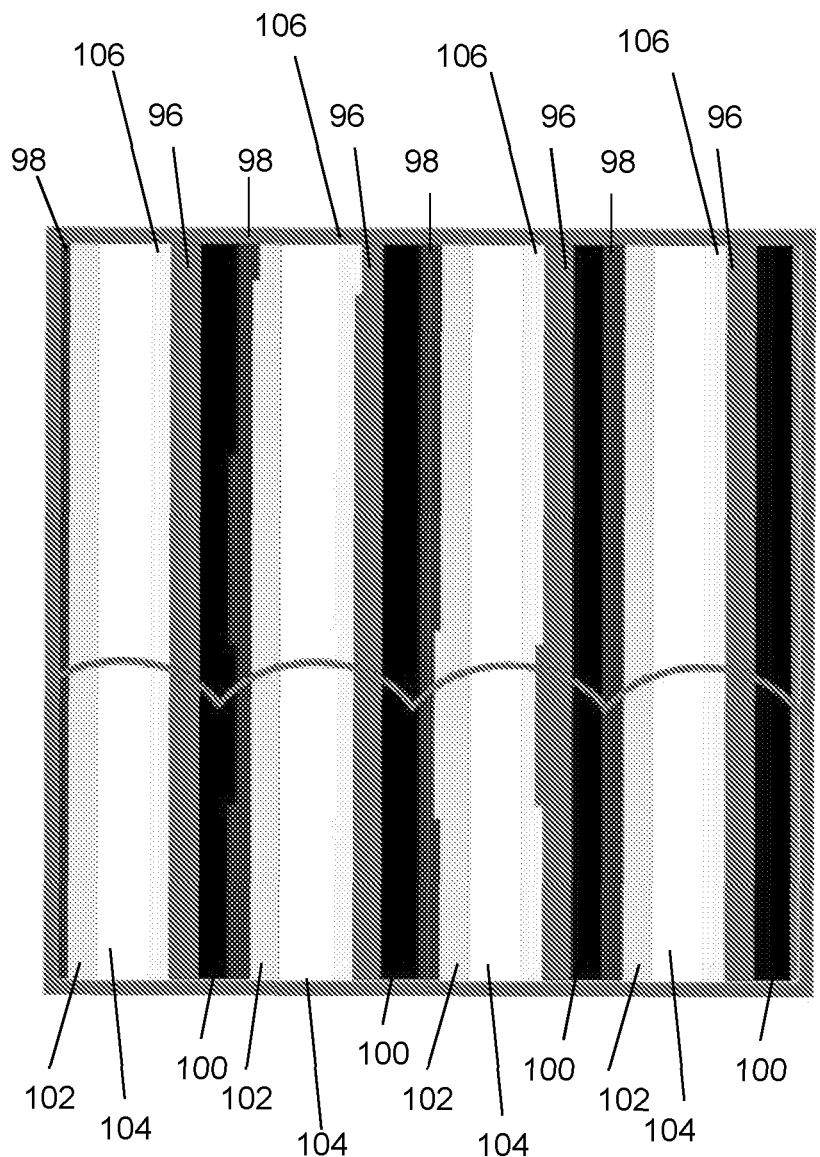
FIG. 11 shows the super-imposed image of the three layers of FIGS. 10a, 10b and 10c.

Referring now to FIG. 11, which shows the final superimposed composite image of all three image layers as shown in FIGS. 10a, 10b and 10c. Assuming additive colours, any regions with blue and green layers overlapping will project the colour cyan, any regions with green and red layers overlapping will project the colour yellow, any regions with blue, green and red layers overlapping will project the colour white and any regions with a single layer will project the colour of that layer. A region with no layers will not project any colour and will be equivalent to black (again, assuming additive colour space). Thus FIG. 11 shows multiple vertical regions in different possible colours of red 96, green, blue 98, black 100, cyan 102, white 104 and yellow 106 from the different superposition of the three original image colour layers of red, green and blue.

Thus the final colour projected of this composite image of FIG. 11 at a particular viewing angle will depend on the proportion of the lens focal width occupied by each of the possible colours of white, black, green, blue, cyan and yellow. At yet another viewing angle, the complementary colour version of the final colour of the composite image will be projected. This will allow the image to show a multiple colour switch effect.

A final additional partial or all-over printed layer may be used in any embodiment of the invention, and may be printed as one of a selection of white, off-white or a light shade of any colour. A black or dark shade of any colour could also be used. This additional layer is an opacifying layer with a colour typically different from the colours of the other layers. This additional layer serves the function of increasing the visibility and/or contrast of the projected image of the security device when viewed in reflection, for example, when the light source is on the same side of the security device as the viewer. However, if the additional layer is not present, the projected image of the security device may be viewed in transmitted lighting conditions, for example, when light is transmitted through the security device.

Alternatively, the layer may be partially or fully printed on the opposite surface of the focusing elements before the printing of the colour layers.

Figure 12:
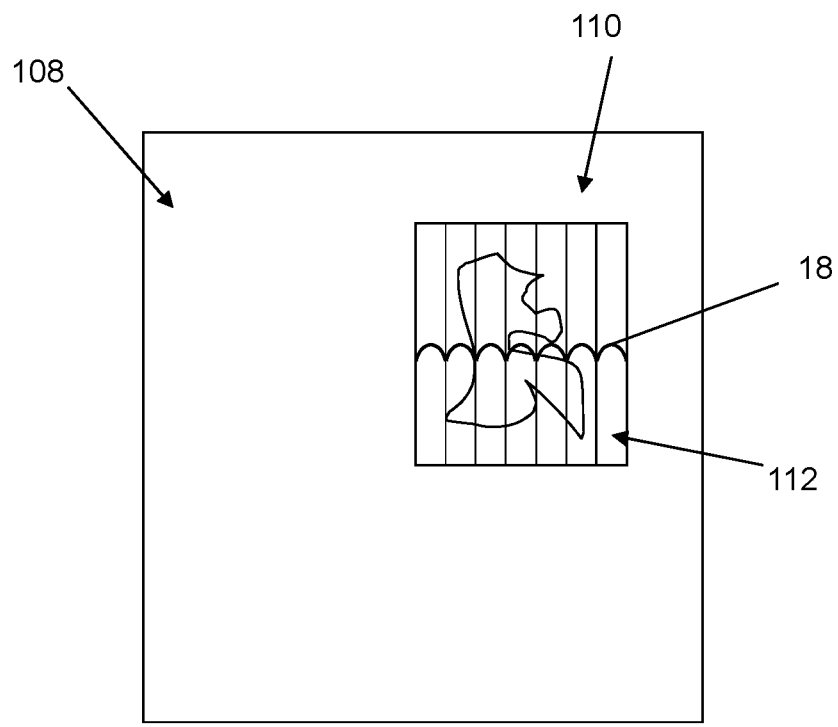
FIG. 12 shows a security document or device including a security element according to an embodiment of the present invention.

In FIG. 12, there is shown a security document or security device 108 that includes a security element 110. The security element 110 may include at least one of the composite images 112 in any of the embodiments described above or as shown in the figures. Each composite image 112 may have at least one image regions included. The security element 110 includes a plurality of focusing elements 18. When viewed through the focusing elements 18, one image will be viewable, showing a first coloured image at a certain viewing angle while at another different viewing angle, a second image may be viewed that is a colour complementary version of the first image.

Figure 13:
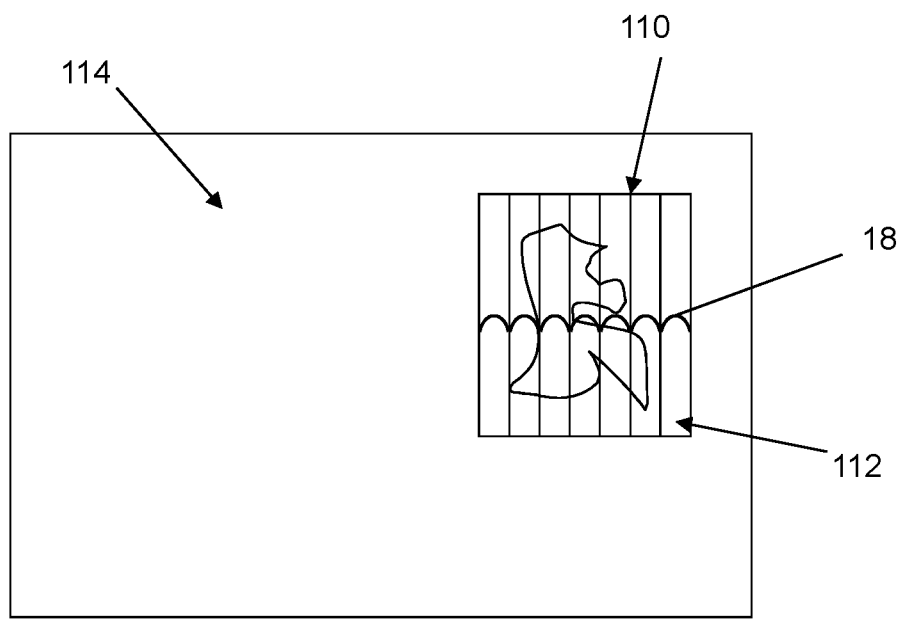
FIG. 13 shows a bank note including a security element according to an embodiment of the present invention.

Finally referring to FIG. 13, there is a shown a bank note 114 that includes the security element 110. Similarly to FIG. 12, the security element 110 includes at least one of the composite images 112 in any of the embodiments described above or as shown in the figures. The security element 110 includes a plurality of focusing elements 18. When viewed through the focusing elements 18, one image will be viewable, showing a first coloured image at a certain viewing angle while at another different viewing angle a second image may be viewed that is a colour complementary version of the first image.

The security element described above can be arranged on a security device for incorporation or application to a product or can be integrated or applied to a security document and particularly, a bank note. The security element is of particular suitability, but isn't restricted to, integration into a transparent polymer substrate used in bank notes. More particularly, it can be included in a window or half-window in such a bank note as a security feature.

In yet another embodiment of the present invention, instead of the three additive colour channels used to represent the RGB colours of each layer, it is envisaged that a four channel subtractive CMYK colour system may be used.

Further modifications and improvements may be made without departing from the scope of the present invention. For example, an alternative colour system may be used than the standard RGB or CMYK suggested above, and may include colour systems with similar colours to the standard RGB or CMYK colour systems.

Alternatively, a two or three channel subtractive colour system or a two or three channel additive colour system may be used, in any embodiment of the invention. A two or three colour system would be able to provide the advantage of being simpler and cheaper to implement and produce. Most advantageously, a two or three colour system would be most likely to result in the highest contrast image. Spot colours, or preferably custom designed pairs of colours, possibly of contrasting colours, that do not correspond to the colours of standard colour channels, such as the RGB and CMYK colour systems, may be chosen to produce the highest contrast images.

Further, the focusing elements of the security element may be located on one side of a transparent or translucent substrate, while the image regions may be located on the opposite side of the transparent or translucent substrate.

As an example of modifications and improvements to the present invention, the focusing elements of the security element may also include at least one of a selection including refractive or diffractive part cylindrical lenses, prisms or zone plates, refractive or diffractive part spherical lenses or polygon based micro lenses, diffractive elements including diffraction gratings or at least one sampling screen. Furthermore, the focusing elements may have sampling screens that may have printed parallel lines or screen elements including screen elements that have locations that may be a function, such as a mathematical function or may be proportional to the offsets of the layers of the image region. The focusing regions may be located a distance t that may vary according to an optimal thickness of the substrate including that t is substantially the same or less than the focal length of the focusing elements and more particularly, substantially half the focal length of the focusing elements. The optimal thickness of the substrate may be a constrained optimisation. For example, for bank note substrates, it is desirable to limit t to a range of values between about 85 microns and 100 microns. Constrained optimisation methods are known in the art.

Additionally, examples of modifications and improvements to the present invention include that the image regions of the security region may vary, in that they may include geometrically shaped elements, such as line elements or dot elements. More particularly, line or dot elements where the width is substantially equal to or greater than half the width of the focusing elements.

Other modifications may also include line or dot elements where the width is substantially equal to the focal point width at the image plane, and line or dot elements where the width differs from the focal point width at the image plane by a predetermined amount. That is, the focusing elements are "out-of-focus" in that the focal region is substantially equal to the width of the line or dot elements. This type of focussing is shown, in particular, in FIGS. 6a, 6b and 7.

The method of applying the image regions may also include gravure printing, offset printing, flexographic printing, screen printing or embossing.

The invention claimed is:

1. A security element including:
a plurality of focusing elements,
a plurality of image regions where each image region is associated with a focusing element,
each image region is printed with at least two layers,
the first layer is offset by a first predetermined amount from a reference axis in the image region,
the second layer is offset by a second predetermined amount from a reference axis in the image region,
each layer being in different colours, and
each image region includes at least a first and second sub-region, wherein a first image is formed in a first range of viewing angles from the first sub-region and a second image is formed in a second range of viewing angles from the second sub-region.

2. A security element according to claim 1 wherein the second image is a complementary colour version of the first image.

3. A security element according to claim 1 including that the image region is printed with a third layer wherein the third layer is a different colour to either the first or second layer and that the third layer is offset by a third predetermined amount from the reference axis in the image region.

4. A security element according to claim 1 including that at least one of the layers of the image region are printed with a colour that corresponds to the RGB colour channel of a colour image with RGB channels or to the CMYK colour channel of a colour image with CMYK colour channels.

5. A security element according to claim 1 including that the at least two layers are contrasting colours.

6. A security element according to claim 1 including that at least one offset is a function of a gray-scale value of the colour channel of the colour of the corresponding layer.

7. A security element according to claim 1 including that the focusing elements are located on one side of a transparent or translucent substrate and that the image regions are located on the opposite side of the transparent or translucent substrate.

8. A security element according to claim 1 including that the focusing elements are located a distance from image regions which is substantially half the focal length of the focusing elements or the focusing elements are located a distance from image regions which is substantially the same or less than the focal length of the focusing elements.

9. A security element according to claim 1, wherein the focusing elements are selected from the group of refractive or diffractive part cylindrical lenses, prisms or zone plates; refractive or diffractive part spherical lenses or polygon based micro lenses; a sampling screen having printed parallel lines; and line elements, dot elements or elements of other shapes.

10. A security element according to claim 1 including that the image regions have a width substantially equal to or greater than half the width of the focusing elements.

11. A security element according to claim 1 including that the image regions have a width substantially equal to, or that differs from by a predetermined amount. the focal point width of the focusing elements at the image plane.

12. A security element according to claim 1 including that the image regions are applied using gravure printing, offset printing, flexographic printing, screen printing or embossing.

13. A security document including the security element of claim 1.

14. A method of forming a security element including the steps of:
providing a transparent or translucent substrate,
applying a plurality of focusing elements to a first surface of the transparent or translucent substrate,
applying a plurality of image regions to the opposite surface of the substrate with at least two layers,
wherein the first layer is offset by a first predetermined amount and the second layer is offset by a second predetermined amount from a reference axis in each image region,
each layer is printed in different colours and wherein
each image region includes at least a first and second sub-region, wherein a first image is formed in a first range of viewing angles from the first sub-region and a second image is formed in a second range of viewing angles from the second sub-region.

15. A method according to claim 14, wherein the second image is a complementary colour version of the first image.

16. A method according to claim 14. wherein each image region includes a third layer, different in colour to either the first or second layer, wherein the third layer is offset by a third predetermined amount from the reference axis in the image region.

17. A method according to claim 14. wherein each layer colour corresponds uniquely to a colour channel colour in the RGB or CMYK colour spacer.

18. A method according to claim 14, wherein at least one offset is a function of a gray-scale value of the colour channel of the colour of the corresponding layer.

19. A method according to claim 14, wherein the focusing elements are applied according to the steps of applying a radiation curable ink to the substrate; embossing the radiation curable ink to create focusing elements in the form of cylindrical lenses, spherical lenses, or diffractive structures: and curing the radiation curable ink.

20. A method according to claim 14, wherein the image regions have a width substantially equal to or greater than half the width of the focusing elements or substantially equal to the focal point width of the focusing elements in the image plane, or the image regions have a width that differs from the focal point width of the focusing elements at the image plane by a predetermined amount.

21. A method according to claim 14, wherein the image regions are applied by one or more of gravure printing, offset printing, flexographic printing, screen printing, and embossing.

* * * * *